(12) United States Patent
Wada

(10) Patent No.: US 11,167,597 B2
(45) Date of Patent: Nov. 9, 2021

(54) TIRE

(71) Applicant: Sumitomo Rubber Industries, Ltd., Kobe (JP)

(72) Inventor: Shoichi Wada, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 680 days.

(21) Appl. No.: 15/947,374

(22) Filed: Apr. 6, 2018

(65) Prior Publication Data

US 2018/0312009 A1 Nov. 1, 2018

(30) Foreign Application Priority Data

Apr. 28, 2017 (JP) .............................. JP2017-090218

(51) Int. Cl.
*B60C 11/03* (2006.01)
*B60C 11/12* (2006.01)
*B60C 11/13* (2006.01)
*B60C 11/11* (2006.01)

(52) U.S. Cl.
CPC ...... *B60C 11/0306* (2013.01); *B60C 11/0309* (2013.01); *B60C 11/1204* (2013.01); *B60C 11/1376* (2013.01); *B60C 11/1384* (2013.01); *B60C 11/1392* (2013.01); *B60C 11/11* (2013.01); *B60C 2011/036* (2013.01); *B60C 2011/0346* (2013.01); *B60C 2011/0358* (2013.01); *B60C 2011/0381* (2013.01); *B60C 2011/1213* (2013.01); *B60C 2200/04* (2013.01)

(58) Field of Classification Search
CPC ............................. B60C 11/0306; B60C 11/11
See application file for complete search history.

(56) References Cited

U.S. PATENT DOCUMENTS

| 5,135,038 A | * | 8/1992 | Graas | ................. B60C 11/0306 152/209.18 |
|---|---|---|---|---|
| 2014/0124110 A1 | | 5/2014 | Takahashi | |
| 2017/0057297 A1 | * | 3/2017 | Takemori | ............... B60C 11/12 |
| 2017/0326919 A1 | * | 11/2017 | Heinhaupt | ............. B60C 11/11 |

FOREIGN PATENT DOCUMENTS

JP 2013-6515 A 1/2013

* cited by examiner

*Primary Examiner* — Timothy Kennedy
*Assistant Examiner* — Alexander A Wang
(74) *Attorney, Agent, or Firm* — Birch, Stewart, Kolasch & Birch, LLP

(57) ABSTRACT

A tire 1 comprises a tread portion 2 provided with a plurality of blocks 5 arranged therein. The blocks 5 include at least one first block 20 comprising a first part 6 arranged on one side in a tire circumferential direction and a second part 7 arranged on the other side in the tire circumferential direction. The first part 6 extends in the tire circumferential direction with a substantially constant width (Wa) in a tire axial direction. The second part 7 has a width (Wb) in the tire axial direction larger than that of the first part 6 so that the second part 7 protrudes axially outwardly from the first part 6 so as to protrude more toward one side in the tire axial direction.

13 Claims, 7 Drawing Sheets

TIRE

TECHNICAL FIELD

The present invention relates to a tire provided in a tread portion with a plurality of blocks.

BACKGROUND ART

In consideration of running on a slippery snowy road, in the tread portion, various types of tire have been proposed which have a block pattern in which main grooves extending in a tire circumferential direction in a zigzag manner, lateral grooves, and a plurality of blocks divided by the main grooves and the lateral grooves are formed.

Although the tires having the above-mentioned block pattern can enhance on-snow traction, there is room for improvement on drainage performance.

SUMMARY OF THE INVENTION

The present invention was made in view of the above, and a primary object thereof is to provide a tire capable of improving the drainage performance and on-snow performance in a good balance.

In one aspect of the present invention, a tire comprises a tread portion provided with a plurality of blocks arranged therein, wherein the plurality of the blocks include at least one first block comprising a first part arranged on one side in a tire circumferential direction and a second part arranged on the other side in the tire circumferential direction, the first part extends in the tire circumferential direction with a substantially constant width in a tire axial direction, and the second part has a width in the tire axial direction larger than that of the first part so that the second part protrudes axially outwardly from the first part so as to protrude more toward one side in the tire axial direction.

In another aspect of the invention, it is preferred that the second part comprises a first protruding portion protruding from the first part toward the one side in the tire axial direction with a largest protruding amount.

In another aspect of the invention, it is preferred that the first protruding portion is formed in a tapered shape in which a length thereof in the tire circumferential direction decreases toward a protruding end thereof.

In another aspect of the invention, it is preferred that the second part comprises a second protruding portion protruding from the first part toward the other side in the tire axial direction with a smaller protruding amount than that of the first protruding portion.

In another aspect of the invention, it is preferred that the first protruding portion comprises a ground contacting surface, a wall surface extending inwardly in a tire radial direction from the ground contacting surface, and a convex portion locally protruding and arranged radially inside the wall surface.

In another aspect of the invention, it is preferred that the plurality of the blocks include a plurality of the first blocks and second blocks arranged alternately in the tire circumferential direction, and the second blocks each have a ground contacting surface having a contour shape obtained by reversing a ground contacting surface of the first block.

In another aspect of the invention, it is preferred that the blocks provided in the tread portion include a pair of the first block and the second block arranged so that the second parts thereof face each other with a lateral groove therebetween, and end portion edges in the tire circumferential direction of the pair of the first block and the second block are each inclined with respect to the tire axial direction so that the lateral groove is inclined with respect to the tire axial direction.

In another aspect of the invention, it is preferred that the end portion edges of the first block and the second block each extend in a zigzag manner so that the lateral groove extends in a zigzag manner.

In another aspect of the invention, it is preferred that a maximum width in the tire axial direction of the second part is in a range of from 1.1 to 1.5 times a maximum width in the tire axial direction of the first part.

In another aspect of the invention, it is preferred that the blocks are crown blocks arranged on a tire equator.

DESCRIPTION OF THE PREFERRED EMBODIMENT

An embodiment of the present invention will now be described in conjunction with accompanying drawings.

Figure 1:
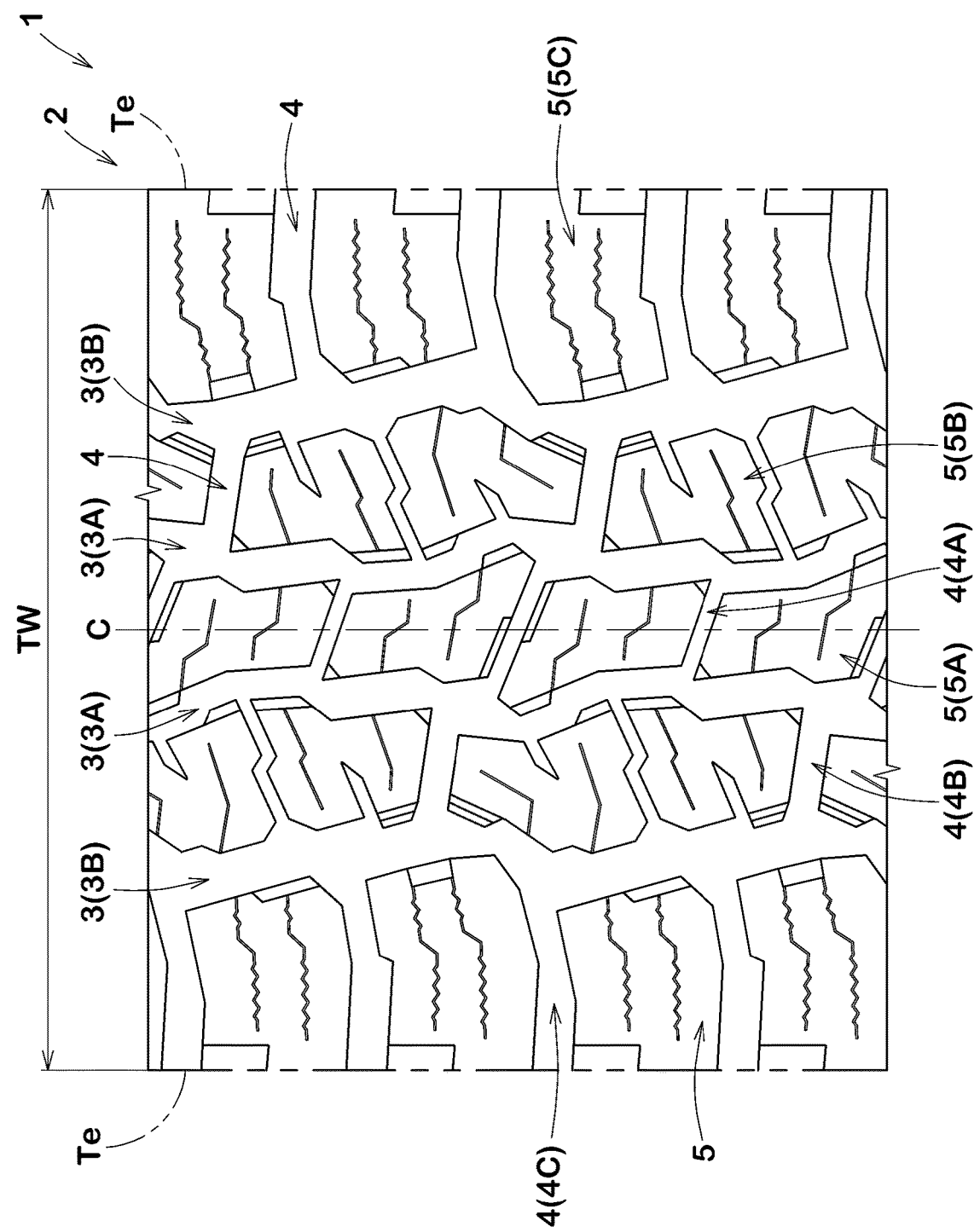
FIG. 1 is a development view illustrating a tread portion of a tire as an embodiment of the present invention.

FIG. 1 is a development view of a tread portion 2 of a tire 1 according to an embodiment of the present invention. In this embodiment, a pneumatic tire for a passenger car is shown as a preferred example. However, it goes without saying that the present invention can also be applied to the tire 1 of other categories, for example, a tire for heavy loads and the like.

As shown in FIG. 1, the tread portion 2 in this embodiment is provided with main grooves 3 extending in a tire circumferential direction and a plurality of lateral grooves 4 extending in a tire axial direction.

The main grooves 3 in this embodiment extend continuously in the tire circumferential direction. The main grooves 3 in this embodiment include a pair of crown main grooves 3A disposed on both sides of a tire equator (C) and a pair of shoulder main grooves 3B each disposed between one of the crown main grooves 3A and its adjacent one of tread edges (Te). It should be noted that the main grooves 3 are not limited to such a configuration and may be embodied in various configurations.

The "tread edges (Te) are determined as axially outermost ground contacting positions of the tire 1 when the tire 1 in a standard state is in contact with a flat surface with zero camber angle by being loaded with a standard tire load. The standard state is a state in which the tire 1 is mounted on a standard rim, inflated to a standard inner pressure, and loaded with no tire load. A distance in the tire axial direction between the tread edges (Te) of the tire 1 in the standard state is determined as a tread width TW. Dimensions and the like of various parts of the tire 1 are values measured in the standard state unless noted otherwise.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The lateral grooves 4 in this embodiment include crown lateral grooves 4A, middle lateral grooves 4B, and shoulder lateral grooves 4C. The crown lateral grooves 4A in this embodiment extend so as to connect between a pair of the crown main grooves 3A. Each of the middle lateral grooves 4B in this embodiment extends so as to connect between one of the crown main grooves 3A and its adjacent one of the shoulder main grooves 3B. Each of the shoulder lateral grooves 4c in this embodiment extends so as to connect between one of the shoulder main grooves 3B and its adjacent one of the tread edges (Te). Note that the lateral grooves 4 are not limited to such a configuration and may be embodied in various configurations.

The tread portion 2 in this embodiment is provided with a plurality of blocks 5 divided by the main groove 3 and the lateral grooves 4. The blocks 5 in this embodiment include crown blocks 5A, middle blocks 5B, and shoulder blocks 5c. The crown blocks 5A in this embodiment are divided by the pair of the crown main grooves 3A and the crown lateral grooves 4A. The middle blocks 5B in this embodiment are divided by the crown main grooves 3A, the shoulder main grooves 3B, and the middle lateral grooves 4B. The shoulder blocks 5c in this embodiment are divided by the shoulder main grooves 3B, the shoulder lateral grooves 4C and the tread edges (Te).

Figure 2:
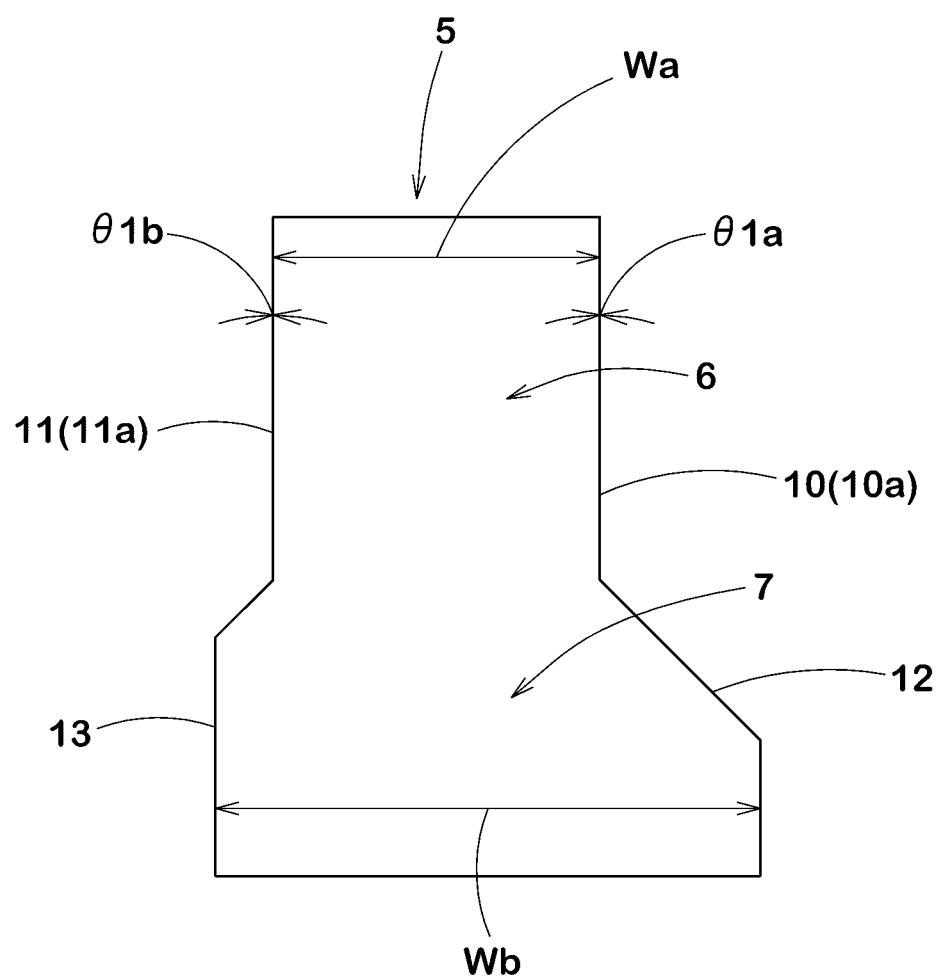
FIG. 2 is a plan view illustrating one of blocks having the basic configuration of the invention.

FIG. 2 is a plan view illustrating the basic configuration of one of the blocks 5 of the present invention. As shown in FIG. 2, at least one, preferably each, of the blocks 5 has a first part 6 arranged on one side in the tire circumferential direction and a second part 7 arranged on the other side in the tire circumferential direction. The first part 6 in this embodiment extends along the tire circumferential direction with a substantially constant width (Wa) in the tire axial direction. The second part 7 has a width (Wb) in the tire axial direction larger than that of the first part 6, therefore, the second part 7 protrudes axially outwardly from the first part 6 so as to protrude more toward one side in the tire axial direction than the other side in the tire axial direction.

The block 5 configured as such forms a relatively large unevenness 12 on a side edge 10 arranged on one side (the right side in FIG. 2) in the tire axial direction. The large unevenness 12 increases the traction and braking force during running on a snowy road surface, therefore, on-snow running performance is improved. Further, when the blocks 5 configured as such receive stress from a road surface, the first parts 6 and the second parts 7 deform in an unbalanced manner. Thereby, snow sandwiched by the unevenness 12 is discharged effectively, therefore, excellent snow discharging performance is exerted. Further, since the block 5 has the first part 6 and the second part 7, a relatively small unevenness 13 is formed on a side edge 11 arranged on the other side (the left side in FIG. 2) in the tire axial direction. The side edge 11 configured as such decreases resistance of drainage of water flowing along the side edge 11. Thereby, the tire 1 of the present invention improves the drainage performance and the on-snow performance in a good balance. It should be noted that the side edge 11 may be configured so as to extend essentially in the tire circumferential direction (not shown), that is, so as not to have the unevenness 13.

In this specification, the "substantially constant" width in the tire axial direction means that an absolute value of angular difference $|\theta1a-\theta b|$ i between an angle ($\theta1a$) of a side edge (10a) arranged on the axially one side of the first part 6 with respect to the tire circumferential direction and an angle ($\theta1b$) of a side edge (11a) arranged on the axially other side of the first part 6 with respect to the tire circumferential direction is not more than 5 degrees. Further, "extending along the tire circumferential direction" means that the angles ($\theta1a$) and ($\theta1b$) of the side edges (10a) and (11a) on both sides in the tire axial direction of the first part 6 are not more than 15 degrees.

Figure 3:
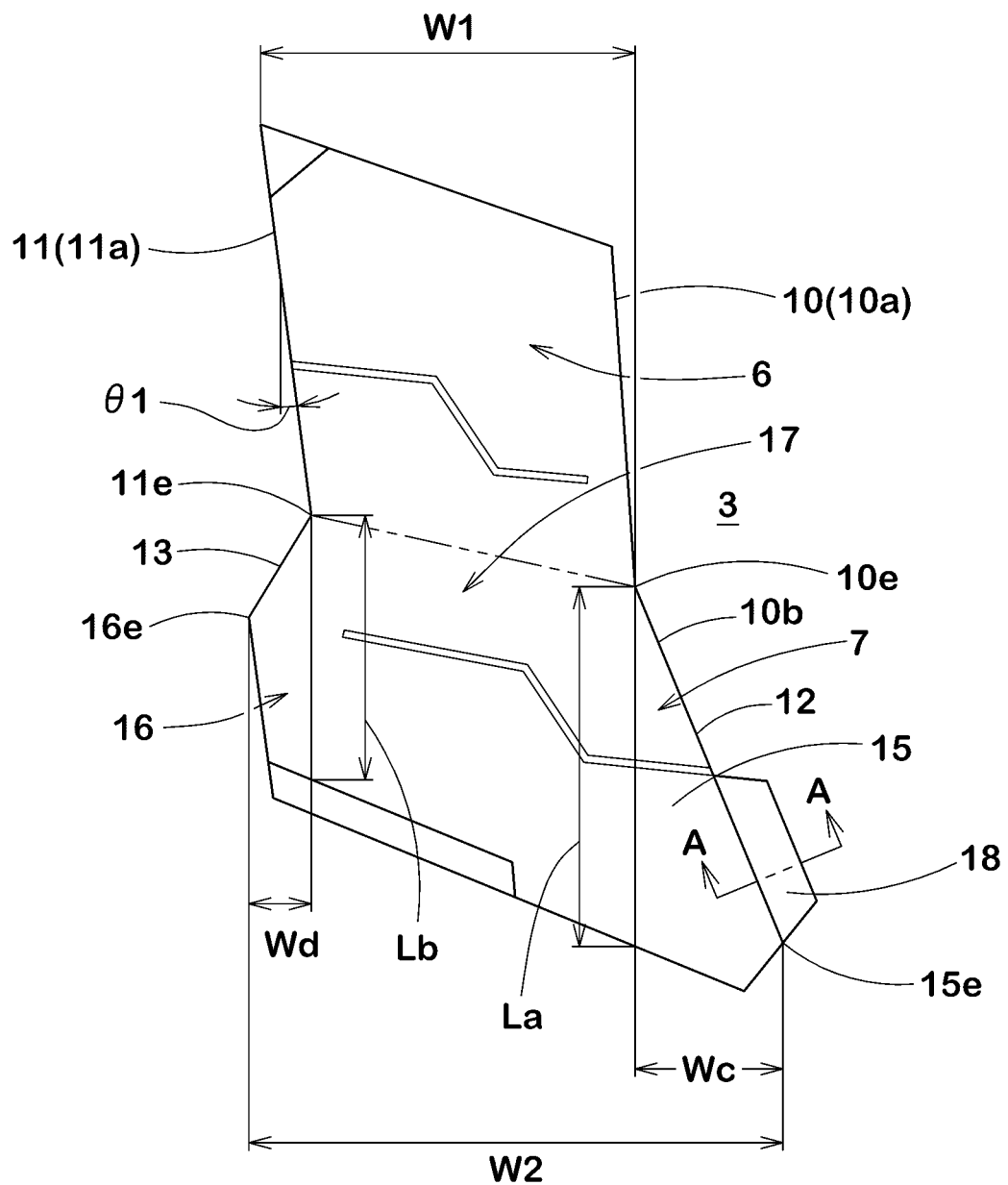
FIG. 3 is a plan view illustrating one of the blocks according to an embodiment of the invention.

FIG. 3 is a plan view illustrating one of the blocks 5 according to an embodiment of the present invention. As shown in FIG. 3, at least one, preferably each, of the blocks 5 in this embodiment has the first part 6 having a parallelogram shape and inclined with respect to the tire circumferential direction and the second part 7 having a trapezoidal shape which is more flattened than the first part 6 in the tire circumferential direction. By the first part 6 and the second part 7 configured as such, the block 5 is formed in a boot-like shape. In this specification, the "parallelogram shape" and the "trapezoid shape" are not limited to only the shapes in a strict sense described in a dictionary and include shapes which a so-called person skilled in the art can recognize as these shapes at first sight.

The first part 6 is an area surrounded by both of the side edges (10a) and (11a) that extend smoothly. Both of the side edges (10a) and (11a) in this embodiment extend straight. Note that both of the side edges (10a) and (11a) are not limited to such a configuration, and for example, they may be configured to extend in a zigzag or wavy manner with a period shorter than the length in the tire circumferential direction of the block 5.

In the first part 6 in this embodiment, the side edge (10a) on the one side and the side edge (11a) on the other side are inclined in the same direction and at different angles with respect to the tire circumferential direction. It should be noted that the first part 6 is not limited to such a configuration and the side edge (10a) on the one side and the side edge (11a) on the other side may be inclined at the same angle or may be inclined in different directions with respect to the tire circumferential direction.

The second part 7 in this embodiment is arranged on the other side in the tire circumferential direction of ends (10e) and (11e) on the other side in the tire circumferential direction of the side edges (10a) and (11a), respectively. The ends (10e) and (11e) are portions where the side edges 10 and 11 are bent, respectively. The ends (10e) and (11e) in this embodiment are the bent portions of the side edges 10 and 11, respectively, arranged closest to the one side in the tire circumferential direction in a central region of the block 5.

The second part 7 includes a first protruding portion 15 protruding from the first part 6 toward the one side in the tire axial direction with a largest protruding amount, a second protruding portion 16 protruding from the first part 6 toward the other side in the tire axial direction with a smaller protruding amount that that of the first protruding portion 15, and a base portion 17 arranged between the first protruding portion 15 and the second protruding portion 16. The first protruding portion 15 in this embodiment is a portion protruding to the one side in the tire axial direction with respect to the end (10e) of the side edge (10a) on the one side. The second protruding portion 16 in this embodiment is a portion protruding to the other side in the tire axial direction with respect to the end (11e) of the side edge (11a) on the other side.

The first protruding portion 15 in this embodiment has a protruding end (15e) protruding most toward the one side in the tire axial direction. The second protruding portion 16 in this embodiment has a protruding end (16e) protruding most toward the other side in the tire axial direction.

The first protruding portion 15 in this embodiment is formed in a tapered shape in which a length (La) in the tire circumferential direction thereof decreases toward the protruding end (15e). The first protruding portion 15 configured as such promotes unbalanced deformation with the first part 6, therefore, it is possible that the snow discharging performance is increased.

The first protruding portion 15 in this embodiment is inclined toward the other side in the tire circumferential direction as it protrudes toward the one side in the tire axial direction. The first protruding portion 15 configured as such decreases resistance of drainage of water flowing along the side edge 10. The first protruding portion 15 in this embodiment protrudes toward the other side in the tire circumferential direction more than the base portion 17.

It is preferred that a protruding width (Wc) of the first protruding portion 15 is in a range of from 30% to 50% of a maximum width W1 in the tire axial direction of the first part 6. If the protruding width (Wc) of the first protruding portion 15 is less than 30% of the maximum width W1 of the first part 6, it is possible that the on-snow running performance and the snow discharging performance are deteriorated. If the protruding width (Wc) of the first protruding portion 15 is more than 50% of the maximum width W1 of the first part 6, the unevenness 12 of a side edge (10b) becomes excessively large, therefore, the resistance of drainage of water flowing along the side edge (10b) is increased, thereby, it is possible that the drainage performance is deteriorated.

Figure 4A:
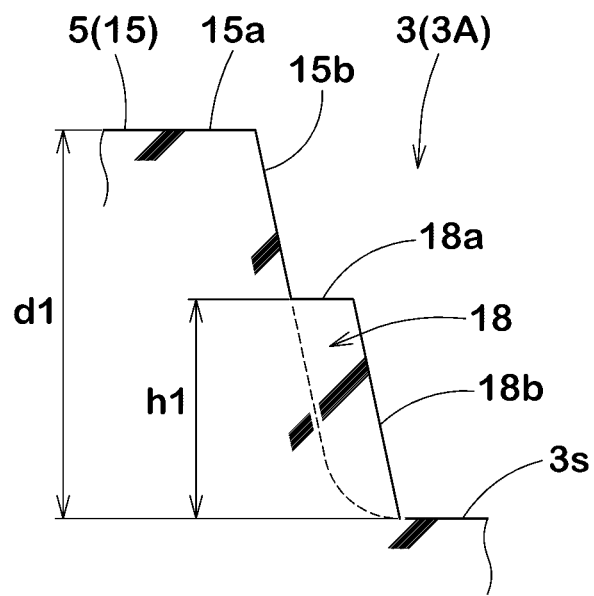
FIG. 4A is a cross-sectional view taken along A-A line of FIG. 3.

FIG. 4A is a cross-sectional view taken along A-A line of FIG. 3. As shown in FIG. 4A, the first protruding portion 15 has a ground contacting surface (15a) and a wall surface (15b) extending inwardly in a tire radial direction from the ground contacting surface (15a).

The first protruding portion 15 in this embodiment has a convex portion 18 locally protruding and arranged radially inside the wall surface (15b). The convex portion 18 configured as such locally increases rigidity of the first protruding portion 15 having a small rigidity, therefore, wear resistance is maintained high.

Figure 4B:
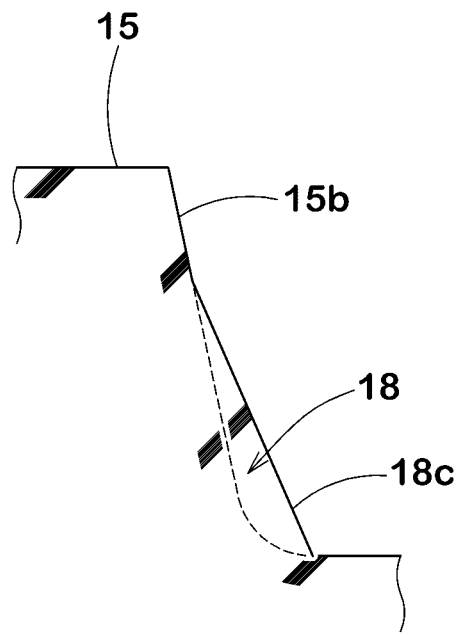
FIG. 4B is a cross-sectional view illustrating another embodiment of FIG. 4A.

The convex portion 18 in this embodiment includes an outer surface portion (18a) extending along the ground contacting surface (15a) of the first protruding portion 15 and a wall surface portion (18b) extending continuously from the outer surface portion (18a) along the wall surface (15b). Note that the convex portion 18 is not limited to such a configuration, and as shown in FIG. 4B, for example, the convex portion 18 may be configured to have a gentle slope portion (18c) extending continuously from the wall surface (15b) of the first protruding portion 15 and inclined at a smaller angle with respect to the tire radial direction.

In order to improve anti-wear performance and the on-snow performance in a good balance, a height (h1) of the convex portion 18 is preferably not less than 40% and not more than 60% of a groove depth (d1) of the main groove 3. The height (h1) of the convex portion 18 is a distance in the tire radial direction between a groove bottom (3s), which is the deepest portion of the main groove 3, and the outer surface portion (18a).

As shown in FIG. 3, the convex portion 18 in this embodiment is provided in the protruding end (15e). The convex portion 18 in this embodiment extends from the protruding end (15e) toward the first part 6 and is provided on a wall surface facing the main groove 3.

The second protruding portion 16 in this embodiment is formed in a tapered shape in which a length (Lb) thereof in the tire circumferential direction decreases toward the protruding end (16e). The second protruding portion 16 configured as such also promotes the unbalanced deformation with the first part 6, therefore, snow sandwiched between the first part 6 and the second protruding portion 16 is effectively discharged.

The second protruding portion 16 in this embodiment protrudes toward the other side in the tire axial direction without being misaligned in the tire circumferential direction with the base portion 17. The second protruding portion 16 configured as such maintains rigidity of the second part 7 high, therefore, the wear resistance is improved.

It is preferred that a protruding width (wd) of the second protruding portion 16 is not more than 25% of the maximum width W1 of the first part 6. If the protruding width (wd) is more than 25% of the first part 6, it is possible that the drainage performance is deteriorated.

It is preferred that a maximum width W2 in the tire axial direction of the second part 7 is not less than 1.1 times the maximum width W1 in the tire axial direction of the first part 6. If the maximum width W2 of the second part 7 is less than 1.1 times the maximum width W1 of the first part 6, the protruding width (Wc) of the first protruding portion 15 becomes small, therefore, it is possible that the on-snow running performance and the snow discharging performance are deteriorated. Further, it is preferred that the maximum width W2 of the second part 7 is not more than 1.5 times the maximum width W1 of the first part 6. If the maximum width W2 of the second part 7 is more than 1.5 times the maximum width W1 of the first part 6, the unevenness 12 of the side edge 10 and the unevenness 13 of the side edge 11 become large, therefore, it is possible that the anti-wear performance is deteriorated in addition to that the drainage resistance becomes large.

Figure 5:
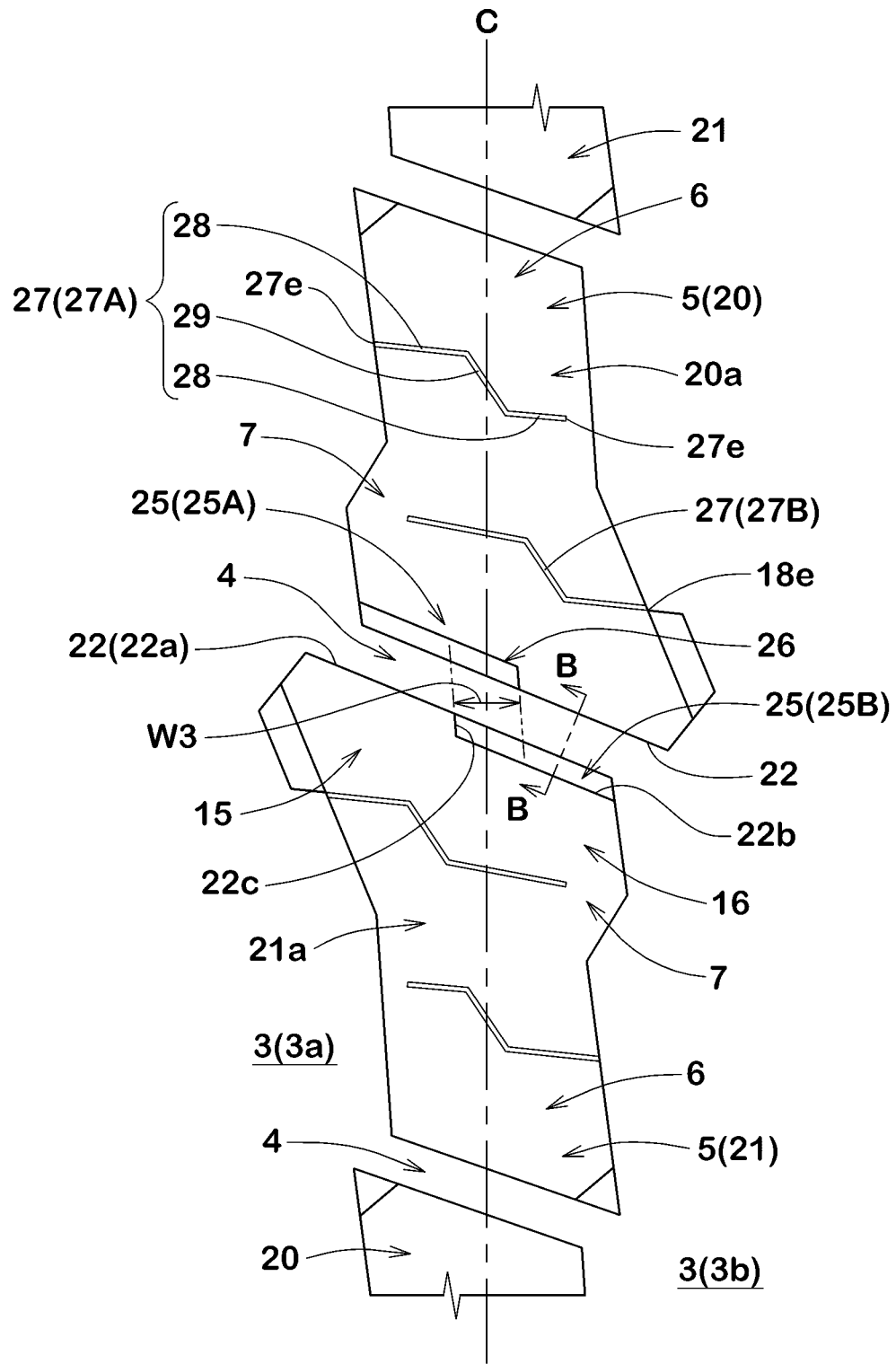
FIG. 5 is an enlarged view illustrating one of crown blocks of FIG. 1.

FIG. 5 is a plan view of the blocks 5 in this embodiment. As shown in FIG. 5, the blocks 5 include at least one first block 20, a plurality of first blocks 20 in this embodiment, and at least one second block 21, a plurality of second blocks 21 in this embodiment. The first blocks 20 and the second blocks 21 in this embodiment are arranged alternately in the tire circumferential direction. Each of the first blocks 20 in this embodiment has the first part 6 and the second part 7. A ground contacting surface (21a) of each of the second blocks 21 has a contour shape obtained by reversing a ground contacting surface (20a) of each of the first blocks 20. That is, each of the second blocks 21 has the first part 6 and the second part 7. Thereby, rigidity difference in the tire circumferential direction of the land region in which this block 5 is provided becomes small, therefore, the anti-wear performance is maintained high.

The blocks 5 in this embodiment includes a pair of the first block 20 and the second block 21 arranged so that the second parts thereof face each other with one of the lateral grooves 4 therebetween.

Each of the first block 20 and the second block 21 has an end portion edge 22 in the tire circumferential direction facing the lateral groove 4. Both of the end portion edges 22 in this embodiment are inclined with respect to the tire axial direction. Thereby, the lateral groove 4 is inclined with respect to the tire axial direction. With the lateral groove 4 configured as such, the end portion edges 22 gradually leaves a road surface during running, therefore, it is suppressed that compressed air in the lateral groove 4 is discharged all at once, thereby, it is possible that pitch noise is decreased.

Both of the end portion edges 22 in this embodiment extend in a zigzag manner. Therefore, the lateral groove 4 extends in a zigzag manner. Thereby, the effect described above is effectively exerted, therefore, noise performance is improved.

The end portion edge 22 in this embodiment includes a first edge portion (22a) disposed on a side of the first protruding portion 15, a second edge portion (22b) disposed on a side of the second protruding portion 16, and a third edge portion (22c) extending in the tire circumferential direction so as to connect between the first edge portion (22a) the second edge portion (22b). Both of the first edge portion (22a) and the second edge portion (22b) are inclined in the same direction with respect to the tire axial direction (in FIG. 5, inclined toward the lower right side). Further, the third edge portion (22c) extends so that the first edge portion (22a) and the second edge portion (22b) do not overlap each other in the tire circumferential direction. The end portion edge 22 configured as such can decrease the pitch noise further effectively.

Figure 6:
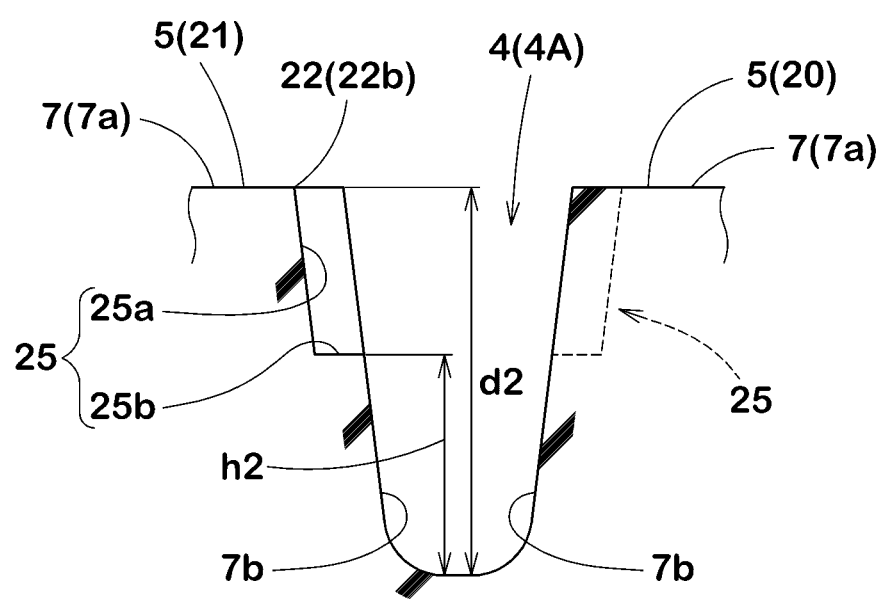
FIG. 6 is a cross-sectional view taken along B-B line of FIG. 5.

FIG. 6 is a cross-sectional view taken along B-B line of FIG. 5. As shown in FIG. 6, each of the second parts 7 includes a ground contacting surface (7a) and a wall surface (7b) extending radially inwardly from the ground contacting surface (7a) so as to face the lateral groove 4.

Each of the second parts 7 in this embodiment is provided with a cutout portion 25 formed so as to be a portion between the wall surface (7b) and the ground contacting surface (7a) is cut out. The cutout portions 25 configured as such suppresses excessive decrease in rigidity of the blocks 5 while increasing groove volume of the lateral groove 4, therefore, the on-snow performance, the drainage performance, and the anti-wear performance are improved in a good balance. Further, the cutout portions 25 increase a wall area of the lateral groove 4, therefore, they disturb vibration of air in the groove, thereby, the noise performance is improved. Each of the cutout portions 25 in this embodiment is configured to include the second edge portion (22b) and the third edge portion (22c).

Each of the cutout portions 25 in this embodiment is configured to include an inward portion (25a) extending radially inwardly from the end portion edge 22 so as to face a center line of the lateral groove 4, and an outward portion (25b) extending continuously from the inward portion (25a) so as to face radially outwardly. It is preferred that the inward portion (25a) extends along the wall surface (7b). It is preferred that the outward portion (25b) extends along the ground contacting surface (7a). The cutout portion 25 is not limited to such a configuration and may be configured to have a slope portion (not shown) inclined with respect to the tire radial direction at a larger angle than the wall surface (7b) so as to connect between the end portion edge 22 and the wall surface (7b), for example.

In order to improve the anti-wear performance, the on-snow performance, and the drainage performance in a good balance, it is preferred that a height (h2) in the tire radial direction of the cutout portion 25 from a groove bottom of the lateral groove 4 is not less than 40% and not more than 60% of a groove depth (d2) of the lateral groove 4.

As shown in FIG. 5, the cutout portion 25 in this embodiment is provided in the second part 7 of each of the first block 20 and the second block 21. A cutout portion 25A of the first block 20 and a cutout portion 25B of the second block 21 have overlapping portions 26 overlapping each other in the tire axial direction. The overlapping portions 26 configured as such increase thickness of a snow block compacted in the lateral groove 4, therefore, shearing force is increased. The overlapping portions 26 in this embodiment are arranged on the tire equator (C) to which large ground contact pressure is applied.

In order to effectively exert the effect described above, it is preferred that a length W3 in the tire axial direction of the overlapping portions 26 is in a range of from 10% to 40% of the maximum width W1 in the tire axial direction of the first part 6.

Each of the blocks 5 is provided with sipes 27 extending in the tire axial direction. Each of the sipes 27 in this embodiment is configured as semi-open type so as to have one end connected with one of the main grooves 3 and the other end terminating within the block 5. In this specification, a sipe is defined as a cut having a width smaller than that of a groove, that is, not more than 1 mm.

The sipes 27 are inclined toward one side (toward lower right in FIG. 5) with respect to the tire axial direction. Each of the sipes 27 includes a pair of end side portions 28 extending straight from both ends (27e), and a central portion 29 inclined at a larger angle with respect to the tire axial direction than the end side portions 28 and extending straight so as to connect between the pair of the end side portions 28.

The sipes 27 include first sipes 27A arranged only in the first parts 6 and second sipe 27B arranged only in the second parts 7. Thereby, deformation of the first parts 6 and the second parts 7 is promoted while excessive decrease in rigidity of the first parts 6 and the second parts 7 is suppressed.

The first sipes 27A in this embodiment are connected with the main groove 3 on the other side. The second sipes 27B in this embodiment are connected with the main groove 3 on the one side. Thereby, rigidity balance of the blocks 5 is maintained high.

An end of each of the second sipes 27B on a side of the main groove 3 is connected with an end portion (18e) of the convex portion 18 in a width direction thereof. The second sipes 27B configured as such suppress decrease in rigidity of the second parts 7, therefore, it is possible that the anti-wear performance is maintained high.

In this embodiment, such blocks 5 each including the first part 6 and the second part 7 are formed as the crown blocks 5A. The crown blocks 5A receives largest ground contact pressure during running, therefore, effect of increasing traction and braking force during running on a snowy road surface is exerted greatly. Note that it is needless to say that the blocks 5 having the first parts 6 and the second parts 7 may be configured as the middle blocks 5B or the shoulder blocks 5c.

Figure 7:
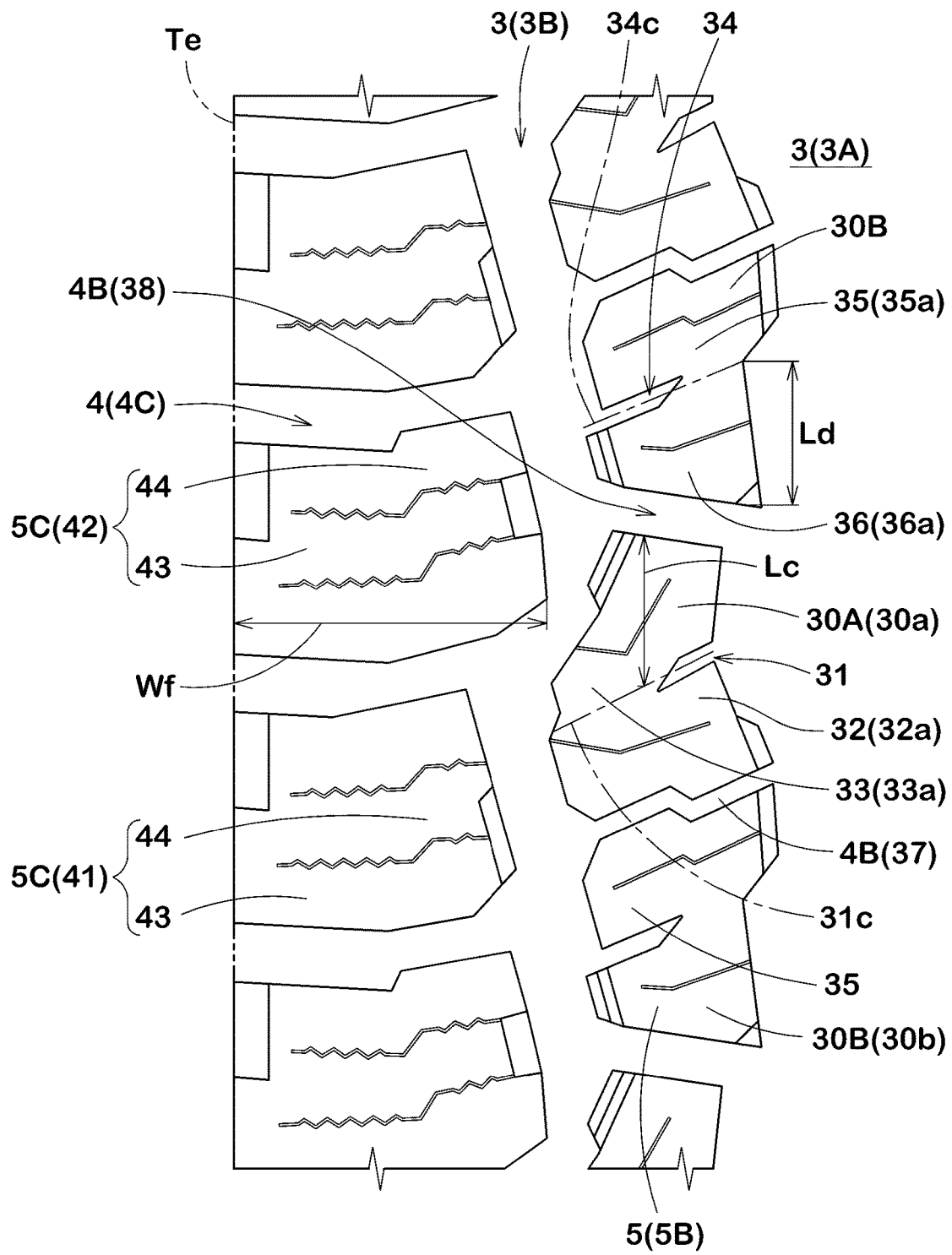
FIG. 7 is an enlarged view illustrating middle blocks and shoulder blocks of FIG. 1.

FIG. 7 is an enlarged view of the middle blocks 5B and the shoulder blocks 5c. As shown in FIG. 7, the middle blocks 5B in this embodiment includes first middle blocks 30A and second middle blocks 30B arranged alternately in the tire circumferential direction. Each of the first middle blocks 30A in this embodiment has a ground contacting surface (30a) having a different shape from a ground contacting surface (30b) of each of the second middle blocks 30B.

Each of the first middle blocks 30A is provided with a first middle lateral groove 31 extending from one of the crown main grooves 3A. Each of the first middle blocks 30A is divided into a first block portion 32 and a second block portion 33 by smoothly extending a groove center line (31c) of the first middle lateral groove 31. The first block portion 32 has a rectangular ground contacting surface (32a). The second block portion 33 has a quadrangular ground contacting surface (33a) having a length (Lc) in the tire circumferential direction decreasing from a center portion of the ground contacting surface (33a) in the tire axial direction to both sides in the tire axial direction.

Each of the second middle blocks 30B is provided with a second middle lateral groove 34 extending from the other one of the crown main grooves 3A. Each of the second middle blocks 30B is divided into a third block portion 35 and a fourth block portion 36 by smoothly extending a groove center line (34c) of the second middle lateral groove 34. The third block portion 35 has a rectangular ground contacting surface (35a). The fourth block portion 36 has a tapered ground contacting surface (36a) having a length (Ld) in the tire circumferential direction decreasing from a side of the tire equator (C) to a side of adjacent one of the tread edges (Te).

The middle lateral grooves 4B includes first middle lateral grooves 37 and second middle lateral grooves 38. Each of the first middle lateral grooves 37 is sandwiched between the first block portion 32 of one of the first middle blocks 30A and the third block portion 35 of one of the second middle blocks 30B adjacent thereto. Each of the second middle lateral grooves 38 is sandwiched between the second block portion 33 of one of the first middle blocks 30A and the fourth block portion 36 of one of the second middle blocks 30B adjacent thereto.

Each of the first middle lateral grooves 37 extends obliquely with respect to the tire axial direction in a zigzag manner. The first middle lateral grooves 37 configured as such disturb vibration of air flowing in the grooves and groove edges thereof gradually leave a road surface, therefore, the noise performance is improved.

The second middle lateral grooves 38 extend straight with larger widths than those of the first middle lateral grooves 37. The second middle lateral grooves 38 configured as such provide large shearing force to snow in the grooves, therefore, the on-snow performance is improved.

The shoulder blocks 5c includes first shoulder blocks 41 and second shoulder blocks 42 each having a width (wf) in the tire axial direction larger than that of each of the first shoulder blocks 41. The first shoulder blocks 41 and the second shoulder blocks 42 are arranged alternately in the tire circumferential direction. Each of the first shoulder blocks 41 and the second shoulder blocks 42 in this embodiment includes a first shoulder portion 43 and a second shoulder portion 44. Each of the first shoulder portions 43 extends axially inwardly from one of the tread edges (Te) along the tire axial direction. In each of the first shoulder blocks 41 and the second shoulder blocks 42, the second shoulder portion 44 is connected with the first shoulder portion 43 and inclined at a larger angle than the first shoulder portion 43 with respect to the tire axial direction.

While detailed description has been made of the tire as an embodiment of the present invention, it is needless to say that the present invention can be embodied in various forms without being limited to the illustrated embodiment.

WORKING EXAMPLE

Example

Tires of size 265/70R17 having the basic pattern shown in FIG. 1 were made by way of test according to the specifications listed in Table 1, and then each of the test tires was tested for the anti-wear performance, the on-snow performance, the drainage performance, and the noise performance. Common specifications of the test tires and the test methods are as follows.

<Crown Blocks>

Height (h1) of Convex portion/Groove depth (d1) of Main groove: 50%

Height (h2) of Cutout portion/Groove depth (d2) of Crown lateral groove: 50%

Protruding width (Wc) of First protruding portion/Maximum width W1 of First part: 40%

<Drainage Performance and On-Snow Performance>

Each of the test tires was mounted on all wheels of a 4WD-car with a displacement of 3500 cc under the following conditions. A test driver drove the test car on a snowy road surface and a wet asphalt road surface covered by 2 mm depth of water of a test course, then the driver evaluated running characteristics related to the traction, running stability, and steering performance by the driver's feeling during the test drive. The results are indicated by an evaluation point based on Reference 1 being 100 wherein a larger numerical value is better.

Tire rim: 17×7.5J

Tire inner pressure: 240 kPa (all wheels)

<Noise Performance>

During the test dive of the test car on a dry asphalt road surface at a speed of 60 km/h, in-car noise was measured. The in-car noise wad measured by using a microphone placed at a position of the driver's head. Evaluation was made by reciprocal of magnitude of the noise (db) and is indicated by an index based on the Reference 1 being 100, wherein the larger the numerical value, the better the noise performance is.

<Anti-Wear Performance>

The above test car was driven on a dry road surface of a test course for 10,000 km and then the wear amount of the crown lateral grooves was measured. Evaluation was made by reciprocal of the measured values and is indicated by an index based on the Reference 1 being 100, wherein larger numerical value is better. The test results and the like are shown in Table 1.

TABLE 1

|  | Ref. 1 | Ref. 2 | Ex. 1 | Ex. 2 | Ex. 3 | Ex. 4 | Ex. 5 | Ex. 6 |
|---|---|---|---|---|---|---|---|---|
| Maximum width W2/Maximum width W1 | 1 | 1 | 1.3 | 1.3 | 1.3 | 1.3 | 1.5 | 1.3 |
| Presence or Absence of Convex portions | Absence | Presence | Presence | Absence | Presence | Absence | Presence | Presence |
| Presence or Absence of Cutout portions | Absence | Presence | Presence | Absence | Absence | Presence | Presence | Presence |
| Ground contacting surfaces of First blocks and Second blocks | Not reversed | Not reversed | Reversed | Reversed | Reversed | Reversed | Reversed | Not reversed |
| Anti-wear performance [index: larger is better] | 100 | 95 | 105 | 95 | 105 | 95 | 90 | 100 |
| On-snow performance [Evaluation point: larger is better] | 100 | 95 | 110 | 105 | 105 | 105 | 110 | 105 |
| Drainage performance [index: larger is better] | 100 | 105 | 105 | 100 | 100 | 105 | 105 | 105 |
| Noise performance [index: larger is better] | 100 | 95 | 105 | 105 | 105 | 105 | 105 | 100 |

From the test results, it was confirmed that the drainage performance and the on-snow performance of the tires as the Examples were improved in a good balance as compared with the tires as the References.

Further, the noise performance and the anti-wear performance were improved in a good balance.

The test was carried out by changing the heights of the convex portions and the heights of the cutout portions in a preferable range, but the same results as in Table 1 were obtained.

The invention claimed is:

1. A tire comprising:
a tread portion provided with a plurality of blocks arranged therein, wherein the plurality of the blocks includes at least one first block comprising a first part arranged on one side in a tire circumferential direction and a second part arranged on the other side in the tire circumferential direction,
the first part extends in the tire circumferential direction with a substantially constant width in the tire axial direction,
the second part has side edge portions on both sides in the tire axial direction each extending from an end on the other side in the tire circumferential direction of a respective one of the axial side edges of the first part,
in the side edge portions, the side edge portion on one side in the tire axial direction extends obliquely with respect to the tire circumferential direction so as to protrude toward the one side in the tire axial direction and the side edge portion on the other side in the tire axial direction extends obliquely with respect to the tire circumferential direction so as to protrude toward the other side in the tire axial direction so that the second part has a width in the tire axial direction larger than that of the first part, and
the second part protrudes axially outwardly from the first part so as to protrude more toward one side than toward the other side in the tire axial direction.

2. The tire according to claim 1, wherein the second part comprises a first protruding portion that protrudes from the first part toward the one side in the tire axial direction by an amount that is the largest protruding amount of the block.

3. The tire according to claim 2, wherein the first protruding portion is formed in a tapered shape in which a length thereof in the tire circumferential direction decreases toward a protruding end thereof.

4. The tire according to claim 2, wherein the second part comprises a second protruding portion protruding from the first part toward the other side in the tire axial direction with a smaller protruding amount than that of the first protruding portion.

5. The tire according to claim 2, wherein the first protruding portion comprises a ground contacting surface, a wall surface extending inwardly in a tire radial direction from the ground contacting surface, and a convex portion locally protruding and arranged radially inside the wall surface.

6. The tire according to claim 1, wherein
the plurality of the blocks includes a plurality of the first blocks and second blocks arranged alternately in the tire circumferential direction,
the second blocks each have a ground contacting surface having a contour shape obtained by reversing a ground contacting surface of the first block,
in each of the first blocks, a contour shape of the ground contacting surface is not point-symmetrical with respect to any point in the ground contacting surface of the first blocks, and
in each of the second blocks, the contour shape of the ground contacting surface is not point-symmetric with respect to any point in the ground contacting surface of the second blocks.

7. The tire according to claim 6, wherein
the blocks provided in the tread portion include a pair of the first block and the second block arranged so that the second parts thereof face each other with a lateral groove therebetween, and
end portion edges in the tire circumferential direction of the pair of the first block and the second block are each inclined with respect to the tire axial direction so that the lateral groove is inclined with respect to the tire axial direction.

8. A tire comprising:
a tread portion provided with a plurality of blocks arranged therein, wherein
the plurality of the blocks includes at least one first block comprising a first part arranged on one side in a tire circumferential direction and a second part arranged on the other side in the tire circumferential direction,
the first part extends in the tire circumferential direction with a substantially constant width in a tire axial direction, the second part has a width in the tire axial direction larger than that of the first part so that the second part protrudes axially outwardly from the first part toward both axial sides so as to protrude more toward one side than toward the other side in the tire axial direction, and the second part comprises a first protruding portion that protrudes from the first part toward the one side in the tire axial direction by an amount that is the largest protruding amount of the block.

9. The tire according to claim 8, wherein the first protruding portion is formed in a tapered shape in which a length thereof in the tire circumferential direction decreases toward a protruding end thereof.

10. The tire according to claim 8, wherein the second part comprises a second protruding portion protruding from the first part toward the other side in the tire axial direction with a smaller protruding amount than that of the first protruding portion.

11. The tire according to claim 8, wherein the first protruding portion comprises a ground contacting surface, a wall surface extending inwardly in a tire radial direction from the ground contacting surface, and a convex portion locally protruding and arranged radially inside the wall surface.

12. The tire according to claim 8, wherein
the plurality of the blocks includes a plurality of the first blocks and second blocks arranged alternately in the tire circumferential direction,
the second blocks each have a ground contacting surface having a contour shape obtained by reversing a ground contacting surface of the first block,
in each of the first blocks, a contour shape of the ground contacting surface is not point-symmetrical with respect to any point in the ground contacting surface of the first blocks, and
in each of the second blocks, the contour shape of the ground contacting surface is not point-symmetric with respect to any point in the ground contacting surface of the second blocks.

13. The tire according to claim 12, wherein
the blocks provided in the tread portion include a pair of the first block and the second block arranged so that the second parts thereof face each other with a lateral groove therebetween, and
end portion edges in the tire circumferential direction of the pair of the first block and the second block are each inclined with respect to the tire axial direction so that the lateral groove is inclined with respect to the tire axial direction.

\* \* \* \* \*